US010647300B2

(12) United States Patent
Shirazi et al.

(10) Patent No.: US 10,647,300 B2
(45) Date of Patent: May 12, 2020

(54) OBTAINING IDENTIFYING INFORMATION WHEN INTRUSION IS DETECTED

(71) Applicant: Toyota Motor Engineering & Manufacturing North America, Inc., Plano, TX (US)

(72) Inventors: Simon J. Shirazi, Canton, MI (US); Clinton J. Williams, Saline, MI (US)

(73) Assignee: Toyota Motor Engingeering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/023,190

(22) Filed: Jun. 29, 2018

(65) Prior Publication Data
US 2020/0001827 A1    Jan. 2, 2020

(51) Int. Cl.
*B60R 25/30* (2013.01)
*G08B 13/196* (2006.01)
(Continued)

(52) U.S. Cl.
CPC .......... *B60R 25/305* (2013.01); *B60R 25/102* (2013.01); *B60R 25/302* (2013.01);
(Continued)

(58) Field of Classification Search
CPC ... B60R 25/305; B60R 25/302; B60R 25/102; B60R 2325/105; B60R 2325/101;
(Continued)

(56) References Cited

U.S. PATENT DOCUMENTS 6,211,907 B1  4/2001  Scaman et al.
7,164,117 B2 *  1/2007  Breed ............... B60R 21/01516
                                              250/208.1

(Continued)

OTHER PUBLICATIONS

Kim et al, Detecting driver fatigue based on the driver's response pattern and the front view environment of an automobile (Year: 2008).*

(Continued)

*Primary Examiner* — Shan E Elahi
(74) *Attorney, Agent, or Firm* — Christopher G. Darrow; Darrow Mustafa PC

(57) ABSTRACT

A vehicle monitoring system is provided for obtaining identification information from a personal electronics device of a potential trespasser responsive to a potential theft, vandalism, or intrusion into a vehicle. The system includes a sensor system including at least one sensor configured to sense a change in an external environment or a status of the vehicle. A receiver device is provided, configured to receive wireless communications. A processor is provided, operatively connected to the sensor system and the receiver device. The processor is programmed to initiate executable operations such as: receiving a signal or information from the at least one sensor of the sensor system; and determining that the signal or information represents or contains information indicative of a theft, vandalism, or unauthorized intrusion into the vehicle. The executable instructions also include obtaining, using the receiving device, identification information from a personal electronic device in proximity of the vehicle.

20 Claims, 3 Drawing Sheets

(51) Int. Cl.
  *H04W 8/00* (2009.01)
  *B60R 25/102* (2013.01)
  *G08B 13/22* (2006.01)
(52) U.S. Cl.
  CPC . *G08B 13/19647* (2013.01); *G08B 13/19695* (2013.01); *G08B 13/22* (2013.01); *H04W 8/005* (2013.01); *B60R 2325/101* (2013.01); *B60R 2325/103* (2013.01); *B60R 2325/105* (2013.01)
(58) Field of Classification Search
  CPC .............. B60R 2325/103; G08B 13/22; G08B 13/19695; G08B 13/19647; H04W 8/005
  USPC .......................................................... 348/148
  See application file for complete search history.

(56) References Cited

U.S. PATENT DOCUMENTS

| | | | | |
|---|---|---|---|---|
| 7,663,502 | B2* | 2/2010 | Breed | B60C 11/24 340/12.25 |
| 7,840,284 | B2* | 11/2010 | Kondo | G05B 15/02 700/10 |
| 9,902,355 | B2 | 2/2018 | Baker et al. | |
| 2005/0046584 | A1* | 3/2005 | Breed | B60C 11/24 340/13.31 |
| 2006/0208169 | A1* | 9/2006 | Breed | B60N 2/002 250/221 |
| 2007/0014439 | A1* | 1/2007 | Ando | G06K 9/00771 382/118 |
| 2014/0199967 | A1* | 7/2014 | Varoglu | H04W 4/21 455/411 |
| 2015/0032905 | A1 | 1/2015 | Celebi et al. | |
| 2015/0258961 | A1* | 9/2015 | Doherty | B60R 25/042 701/2 |
| 2015/0287326 | A1* | 10/2015 | Weller | G08G 1/168 348/148 |
| 2016/0078758 | A1 | 3/2016 | Basalamah | |
| 2016/0360027 | A1* | 12/2016 | Nelson | H04W 76/11 |
| 2017/0123389 | A1* | 5/2017 | Baez | H04W 4/70 |
| 2018/0130347 | A1* | 5/2018 | Ricci | B60R 25/2018 |

OTHER PUBLICATIONS

Website for Libelium (http://www.libelium.com/products/meshlium/smartphone-detection/) accessed on Jun. 28, 2018.
Haigh, Steven, "Tracking people via WiFi (even when not connected)" blog entry (http:/www.crc.id.au/tracking-people-via-wifi-even-when-not-connected/) (2015) accessed on Jun. 28, 2018.
Nordlicht, Donny, Cadillac CT6 features industry-first surround-view video recording system, Cadillac Pressroom (http://media.cadillac.com/media/us/en/cadillac/news.detail.html/content/Pages/news/us/en/2016/jun/0614-ct6-surround-view.html) (Jun. 14, 2016) accessed on Jun. 28, 2018.

* cited by examiner

OBTAINING IDENTIFYING INFORMATION WHEN INTRUSION IS DETECTED

TECHNICAL FIELD

The present disclosure generally relates to obtaining identifying information and, more particularly, to detecting information from a personal electronics device of a trespasser or an unauthorized intruder.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Although unfortunate, incidents such as vehicle thefts, vandalism, and unauthorized intrusions into vehicles may occur. While it may not be possible to fully prevent such acts, it remains desirable to be able to provide increased preventative and/or vehicle safety and security assurances. In many instances, trespassers and unauthorized intruders may utilize disguises or clothing that makes it difficult to detect their identity using common visual detection means, such as images and video, without any additional identifying information.

Accordingly, it would be desirable to provide an improved detection and vehicle monitoring system that has a high rate of success of identifying such trespassers and unauthorized intruders, but yet does not as heavily rely on visual detection means in order to make positive identifications.

SUMMARY

This section provides a general summary of the disclosure, and is not a comprehensive disclosure of its full scope or all of its features.

In various aspects, the present teachings provide a method for obtaining identification information from a trespasser responsive to the detection of a potential theft, vandalism, or unauthorized intrusion into a vehicle. The method includes receiving a signal from at least one sensor in communication with a vehicle controller and configured to sense a change in an external environment or a status of the vehicle. The method further includes determining that the signal represents or contains information indicative of a theft, vandalism, or unauthorized intrusion into the vehicle. Using a receiver device, the method includes obtaining identification information from a personal electronic device in proximity of the vehicle. The method may also include sending a notification to a user indicating that the vehicle may have been subjected to theft, vandalism, or unauthorized intrusion.

In other aspects, the present teachings provide a vehicle monitoring system for obtaining identification information from a personal electronics device of a potential trespasser responsive to a potential theft, vandalism, or an unauthorized intrusion into a vehicle. The vehicle monitoring system includes a sensor system including at least one sensor configured to sense a change in an external environment or a status of the vehicle. A receiver device is provided, configured to receive wireless communications. A processor is provided that is operatively connected to the sensor system and the receiver device. The processor is programmed to initiate executable operations such as receiving a signal or information from the at least one sensor of the sensor system; and determining that the signal or information represents or contains information indicative of a theft, vandalism, or unauthorized intrusion into the vehicle. The executable instructions also include obtaining, using the receiving device, identification information from a personal electronic device in proximity of the vehicle.

In still other aspects, the present teachings provide a vehicle. The vehicle may include a sensor system including at least one sensor configured to sense a change in an external environment or a status of the vehicle. A receiver device is provided, configured to receive wireless communications. The vehicle includes a camera system configured to capture still images, video data, and/or audio data of the external environment. A communications device is provided for various communications. The vehicle has a vehicle control system including a processor operatively connected to the sensor system, the receiver device, the camera system, and the communications device. The processor is programmed to initiate executable operations including: receiving a signal or information from the at least one sensor of the sensor system; and determining that the signal or information represents or contains information indicative of a theft, vandalism, or unauthorized intrusion into the vehicle. The processor is also programmed to initiate executable operations including obtaining still images, video data, and/or audio data of the external environment; and obtaining, using the receiving device, identification information from a personal electronic device in proximity of the vehicle.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides systems and methods useful for assisting in the identification of potential trespassers, vandals, or unauthorized individuals in connection with a vehicle theft, vandalism, and related intrusions with respect to a vehicle. In various aspects, the present teachings provide sensor systems having one or more sensors configured to monitor a vehicle and its surrounding environment in order to detect changes. As will be described in more detail below, the sensors can be configured to detect a variety of parameters that may be indicative of a potential theft, vandalism, or intrusion. The parameters may generally include, for example, detections of motion, force, sound, and/or light. The methods may include receiving a signal from at least one sensor that is in communication with a vehicle controller and configured to sense a change in an external environment or a change in a status of the vehicle. Once the system/method makes a determination that the signal represents or contains information indicative of a theft, vandalism, or unauthorized intrusion into the vehicle, it may begin "sniffing" (i.e., searching) for digital information that may be present. For example, the trespasser or perpetrator may have a personal electronics device on his or her person that emits or solicits digital information that may be linked to, or used to acquire, unique identification information. In various aspects, the methods include using a receiver device to passively or actively obtain identification information from any personal electronic device (or the like) in proximity of the vehicle. The methods may also include sending a notification to a user indicating that the vehicle may have been subjected to theft, vandalism, or unauthorized intrusion. Such a notification may include the identification information as well as other useful evidence, such as a still image, a video recording, and/or an audio recording.

Figure 1:
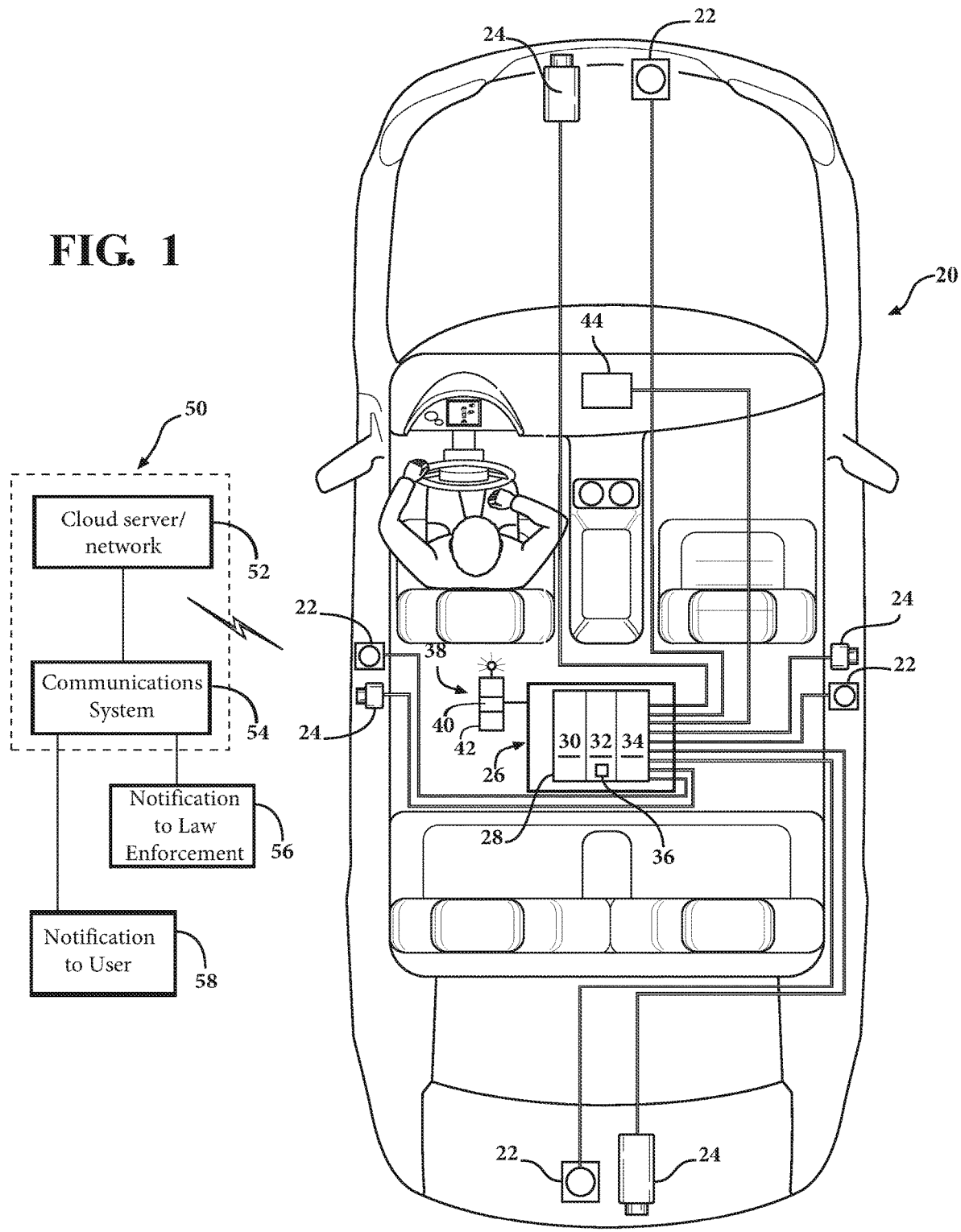
FIG. 1 is an exemplary schematic view of a vehicle with various vehicle systems useful with the present technology.

With reference to the drawings, FIG. 1 schematically illustrates an exemplary vehicle 20 with various non-limiting vehicle systems useful with the present technology. It should be appreciated that although particular vehicle systems may be separately described, each or any of the vehicle systems may be otherwise combined (or segregated) via hardware and/or software, and may be in communication with one another directly or via a network. In some aspects, it will be understood that while various elements are shown as being located in the vehicle 20, they can be located external to the vehicle 20, or remote to the vehicle, such as being physically separated by large distances.

The vehicle 20 may include a sensor system including one or more sensors, generally provided as reference number 22, a vehicle control system 26, and a communication system 38. As used herein, the term "sensor" generally means any device, component, and/or system that can detect and/or sense something. The one or more sensors 22 can be configured to detect and/or sense in real-time. As used herein, the term "real-time" means a level of processing responsiveness that a user or system senses as sufficiently immediate for a particular process or determination to be made, or that enables the processor to keep up with some external process.

For simplicity, FIG. 1 simply illustrates generic representations of sensors 22, the locations of which may vary as desired. In aspects in which the vehicle 20 includes a plurality of sensors 22, the sensors 22 can work independently from each other. Alternatively, two or more of the sensors can operate collectively or in combination with each other. In such case, the two or more sensors can form a sensor network. The sensor system, sensor network, and/or the one or more sensors 22 can be operatively connected to the vehicle control system 26, which may include a processor(s) 30, data store(s) 32, and/or another element of the vehicle 20 (including any of the elements shown in FIG. 1). The sensor system or sensor network can acquire data of at least a portion of the external environment of the vehicle 20 (e.g., nearby vehicles, objects, pedestrians, etc.), in addition to acquire data pertaining to an interior of a vehicle, including a presence, absence, and/or removal of passengers and objects from or near the vehicle 20.

The sensor system can include any suitable type of sensor. Various examples of different types of sensors will be described herein; however, it will be understood that the aspects are not limited to the particular sensors described. The sensor system can include one or more vehicle sensors. The vehicle sensor(s) can detect, determine, and/or sense information about the vehicle 20 itself and any change in a vehicle status. A change in vehicle status can include a door, window, hood, or trunk opening or closing, as well as a window breaking, forced door unlock, handle use, storage compartment opening or closing, etc. In one or more aspects, the vehicle sensor(s) can be configured to detect, and/or sense position and orientation changes of the vehicle 20, such as, for example, based on inertial acceleration, weight/load sensors, light sensors, motion sensors, etc. In one or more aspects, the vehicle sensor(s) can include one or more accelerometers, one or more gyroscopes, an inertial measurement unit (IMU), a vehicle alarm system, a window sensor, a pressure sensor, a shock detector, an impact monitor, a motion detector, a vibration sensor, a force sensor, a dead-reckoning system, a global navigation satellite system (GNSS), a global positioning system (GPS), a navigation system, and/or other suitable sensors. The vehicle sensor(s) can be configured to detect, and/or sense one or more characteristics of the vehicle 20 as well as one or more change in status of the vehicle, such as a change in a characteristic.

The sensor system can include one or more "environment" sensors 22 configured to acquire, and/or sense external environment data. "External environment data" includes data or information about the external environment, or one or more portions thereof, in which the vehicle 20 is located. For example, the one or more environment sensors 22 can be configured to detect, quantify and/or sense objects or obstacles in at least a portion of the proximate external environment of the vehicle 20 and/or information/data about such objects. In various aspects, the objects or obstacles can include humans and animals, and the sensors and/or control systems are able to distinguish between living and inanimate things. Such objects/obstacles may be stationary objects and/or dynamic objects. The one or more environment sensors 22 can also be configured to work with other vehicle systems, for example, to detect, measure, quantify and/or sense other things in the external environment of the vehicle 20, such as, for example, lane markers, signs, traffic lights, traffic signs, lane lines, crosswalks, curbs proximate the vehicle 20, off-road objects, etc. In this regard, the present technology may utilize various sensors already being used by a conventional vehicle, and may not require many additional components.

As an example, in one or more aspects, the environment sensor system can include one or more radar sensors, one or more LIDAR sensors, one or more sonar sensors, one or more cameras or camera sensors, and/or one of the other vehicle sensors as listed above, configured to sense an external environment or change thereof. As an example, FIG. 1 includes a plurality of spaced apart cameras 24 useful for observing the external environment of the vehicle 20. Various cameras may include a motion camera sensor configured to obtain video data such as a video recording, or a still camera sensor configured to obtain a still image. In one or more aspects, the one or more cameras 24 can be high dynamic range (HDR) cameras, infrared (IR) cameras, or thermal imaging cameras. The cameras 24 can also include microphones, or the like, for capturing audio recordings. The sensor system may include various sensors 22 configured to both sense a change in an external environment of the vehicle 20 in addition to a change in status of the vehicle 20.

For example, sensors 22 can be provided to identify a condition associated with the vehicle such as a condition around the vehicle 20, within the vehicle 20, and/or a condition of objects or individuals in close proximity to the vehicle. In one non-limiting aspect, the sensor system may include one or more array or combination of sensors 22 directed outside of the vehicle 20 to identify a condition around the vehicle 20.

Figure 2:
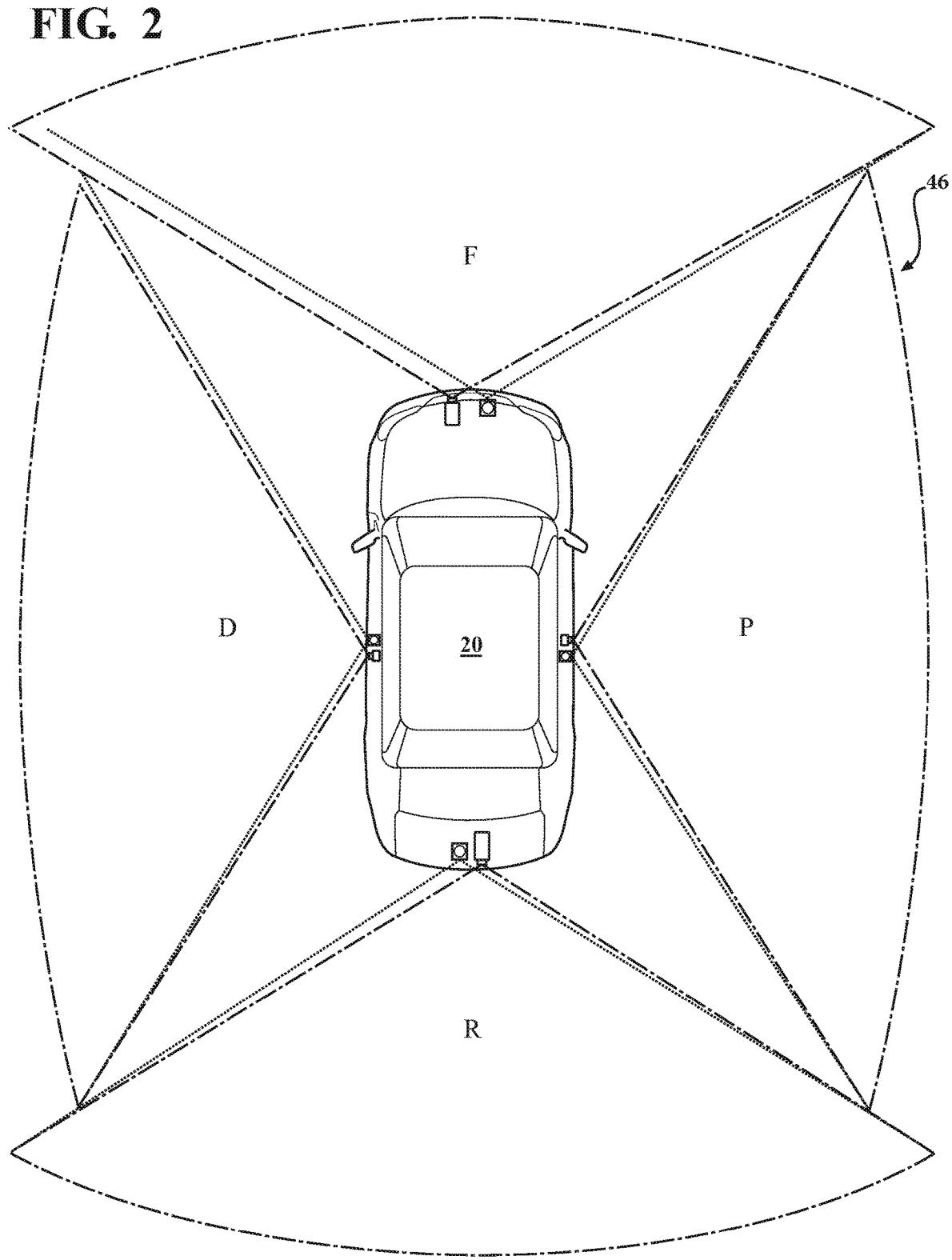
FIG. 2 is an exemplary schematic view illustrating a vehicle with at least one sensor system configured to monitor an external environment adjacent the vehicle.

FIG. 2 is an exemplary schematic view illustrating a vehicle 20 with a plurality or array of sensors configured to monitor an external environment adjacent, and preferably surrounding as much as the vehicle 20 as possible, including up to a complete 360 degree monitoring. The sensor array may include a first plurality of sensors, such as cameras 24 generally operable to view the surrounds of the vehicle, and a second plurality of sensors generally operable to otherwise monitor the vehicle for a change in the external environment or vehicle status. As shown, the first plurality of sensors may provide imagery from within each of a front F, a passenger side P, a rear R, and a driver side D zone 46 of the vehicle 20 to the vehicle control system 26. It should be appreciated that although four sensors are illustrated in the disclosed non-limiting embodiment, any number of sensors will benefit here from. The field of view of each sensor in the first plurality of sensors may overlap to provide a 360 degree view of that which surrounds the vehicle 20. Examples of sensors in the first sensor system 32 include, but are not limited to, video cameras, charge coupled devices, forward looking infrared, thermal systems and/or other imaging sensors and combinations thereof.

With renewed reference to FIG. 1, the vehicle 20 can include a vehicle controller or vehicle control system 26, which generally includes a control module 28 with a processor 30, a data store or memory 32, and at least one interface system 34. The control module 28 and/or processor 30 can be a portion of a central vehicle control, as part of a head unit 44, a stand-alone unit, or other system such as a cloud-based system. In one or more aspects, the processor(s) 30 can be a main processor of the vehicle 20. For instance, the processor(s) 30 can be an electronic control unit (ECU). The data store 32 can include volatile and/or non-volatile memory. Examples of suitable data stores 32 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 32 can be a component of the control module 28 or processor(s) 30, or the data store 32 can be operatively connected to the processor(s) 30 for use thereby. The term "operatively connected," as used throughout this description, can include direct or indirect connections, including connections without direct physical contact. The data store 32 may contain the algorithms or operational software 36 described herein below.

In various aspects, the interface system 34 can be configured to work as a combination with portions that may be referred to as an input system and an output system. An "input system" includes any device, component, system, element or aspect or groups thereof that enable information/data to be entered into a machine. The input system can receive an input from a vehicle passenger (e.g., a driver or a passenger) through various known input devices. An "output system" includes any device, component, or arrangement or groups thereof that enable information/data to be presented to a vehicle passenger (e.g., a person, a vehicle passenger, etc.) through various known output devices and/or displays. The input and output systems of the interface system 34 may also facilitate a coordinated operation with other systems, such as the sensors 22, the communication systems 38, 54, and other vehicle systems.

In one or more aspects, the vehicle 20 may include one or more internal communication system 38 including at least one communication module/device 40 configured to send/receive communications between various vehicle components and vehicle systems, including the several sensors 22. In various aspects, the communication module/device 40 may be configured to be able to work with wireless technology for sending/receiving communication. In various aspects, the communication system 38 may also include one or more receiver device 42, configured to receive wireless communications from external devices, such as personal electronics devices, as will be discussed in more detail below. In other aspects, the present technology may be used with hardware and/or software located at remote locations, designated by reference number 50 for simplicity. The remote location 50 may include a cloud server or remote network 52 that communicates with the vehicle 20 using various known technologies, such as cellular communication, or similar. The remote location 50 may optionally be provided with its own communication system 54 that may be operable to provide notifications to law enforcement or to a user, as indicated by reference numbers 56 and 58, respectively. In various aspects, a user may have a personal electronic device or personal communication device, such as a phone, tablet, or other smart device (not specifically shown) that can be configured to use a specific application, or "app," to communicate with at least one communication system 38, 54 to exchange data or information related to the present technology, including for example, receiving push notifications, text messages, instant messages, and the like.

Figure 3:
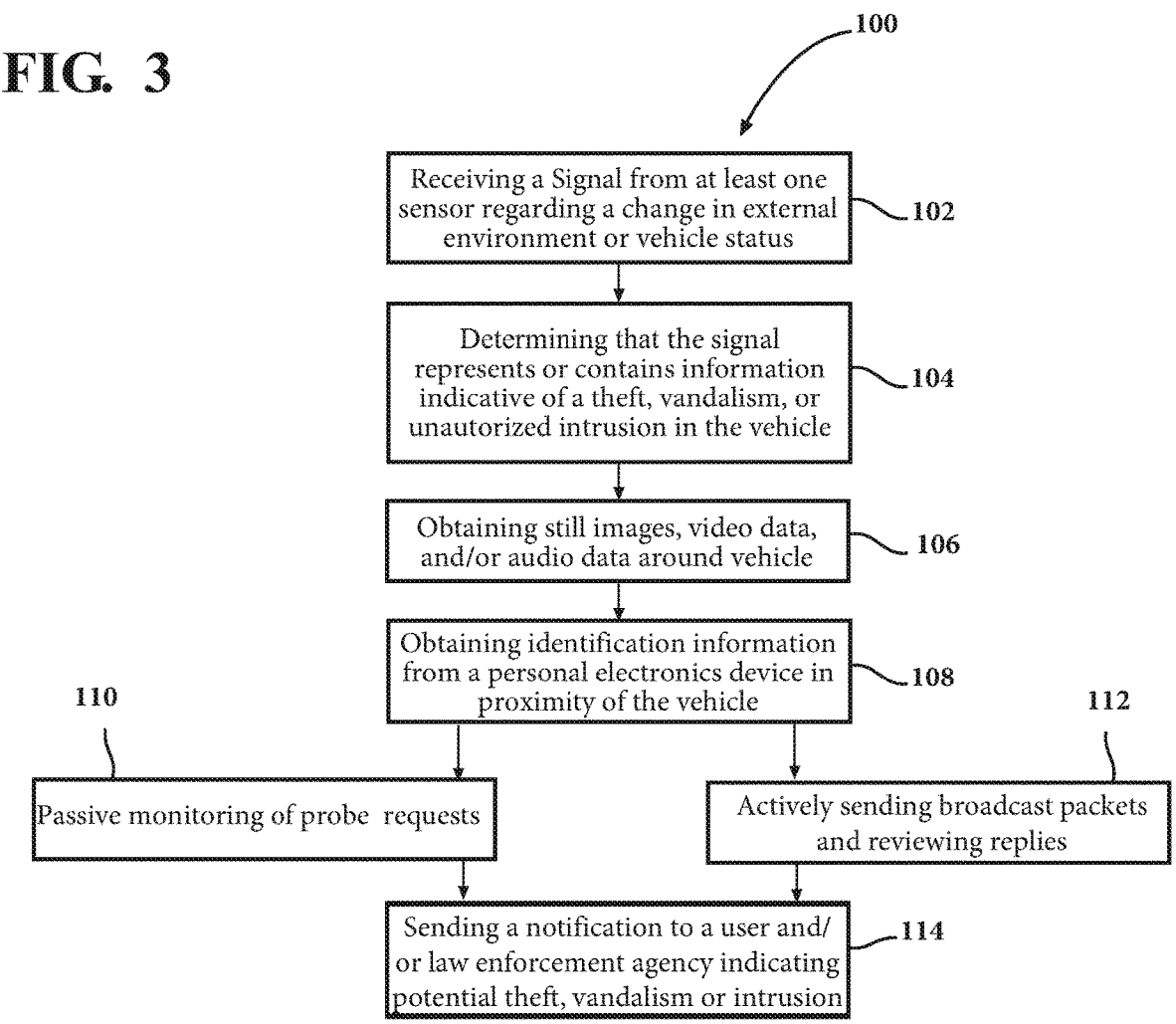
FIG. 3 is a flowchart illustrating one exemplary method of operations for obtaining digital identification information from a trespasser.

FIG. 3 is a flowchart illustrating one exemplary method of operations 100 for obtaining digital identification information from a trespasser responsive to a detection of a potential theft, vandalism, unauthorized intrusion into a vehicle, and the like. In various aspects, the method may begin by monitoring a plurality of sensors 22 strategically located throughout the vehicle 20, and eventually receiving a signal from at least one sensor regarding a change detected with respect to the external environment near the vehicle, or a change in a status of the vehicle, as indicated by method step 102. Once a signal is received, the method optionally proceeds to make a determination of whether or not the signal represents or contains information indicative of a theft, vandalism, or unauthorized intrusion in the vehicle, as indicated by method step 104. This may include sending the data to the processor 30 and performing at least one type of analysis. In one example, the signal can indicate a force received by the vehicle. In certain aspects, the force must exceed a certain threshold force in order to proceed with the method. In another example, based on the signal(s), the processor may determine a presence of a human adjacent the vehicle. In certain aspects, the human needs to be adjacent the vehicle for a time greater than a threshold time in order to proceed with the method. In yet another example, based on the signal(s), the processor may determine that there was an attempt to operate a door handle, and immediately proceed with the method, without any threshold comparison (s). It should also be understood that in certain aspects, for example, where a vehicle alarm is activated, the method does not necessarily need to perform any determination step, and can proceed by simply receiving a signal and bypassing step 104.

Once method step 104 is performed (or bypassed), the method may proceed with obtaining still images, video data, and/or audio data from around the external environment of the vehicle, as indicated by method step 106. In certain aspects, the methods may include reviewing certain of the still images, video data, and/or audio data of the external environment in order to confirm or verify a presence of a trespasser prior to continuing with the method and obtaining identification information. In one example, facial recognition software (or similar technology) can be used to verify the presence of a human. In still other aspects, the method may proceed directly to obtaining identification information from a potential trespasser or intruder without collecting and/or analyzing additional data.

In various aspects, the feature of obtaining identification information from a potential trespasser or intruder according to the present technology includes obtaining identification information from a personal electronic device in a close proximity of the vehicle, as indicated by method step 108. For example, most people, including potential trespassers, thieves, and intruders, carry at least one personal electronic device with them that, likely unknown to them, may routinely emit digital information that can be used for identification purposes. Non-limiting examples of a "personal electronic device" useful with the present technology may include, a smartphone, a smartwatch, a smart wearable device, a portable computer, an RFID-equipped device, an NFC-equipped device, a tablet, an e-reader, and the like.

The identification information may be obtained using a receiver device 42. In various aspects, the receiver device 42 includes at least one of a Wi-Fi scanner, a Bluetooth scanner, a RFID reader, a NFC reader, and a digital signal processing (DSP) receiver configured to obtain the identification information from the personal electronic device in a certain predefined proximity of the vehicle The receiver device 42 may be in communication with the vehicle control system 26, processor 30, and/or communication system 38. In various aspects, the identification information may include at least one identifier, such as a vendor name, a device name, a username, a media access control (MAC) address, a received signal strength indicator (RSSI), an access point (AP), a class of device (CoD), a timestamp, a serial number, and a model number associated with the personal electronic device. It is envisioned that the receiver device 42 can work in a passive mode or an active mode, depending on the type of information that it will be configured to collect. In one example of a passive mode operation, the receiver device 42 can be configured to passively receive and extract identification information from a probe request that is routinely emitted by the personal electronic device in search of a signal connection, as indicated by method step 110. In an example of an active mode operation, the receiver device 42 can be configured to actively send a broadcast packet of information on at least one communication channel, and then receive and extract identification information from a reply communication sent by the personal electronic device, as indicated by method step 112. The above examples are merely provided as representative examples, and it is envisioned that the receiver device 42 may be configured to operate in a variety of manners, commensurate with the ongoing, continuous advances in technology and communications between electronic devices.

In certain optional aspects, the receiver device 42 may alternatively be configured to collect data continuously, saving the data and overwriting the data as necessary depending on space limitations. The data can subsequently be viewed by a user and/or archived for later use.

Once the identification information is obtained, the methods may proceed with sending a notification to a user and/or law enforcement agency in order to indicate to them that the vehicle may have been subjected to a potential theft, vandalism, or unauthorized intrusion into the vehicle, as indicated by method step 114. Although not specifically shown in FIG. 3, the methods can further include transferring data representative of at least one signal received from a sensor, or identification information received from the receiver device 42 to a remote location 50, such as a cloud server/network 52, for remote storage and use. In this regard, the notification sent to a user or other entity can originate from a communication system 38 present in the vehicle 20, or at a communication system 54 affiliated with remote location 50. In other aspects, the identification information and other collected data may be stored on an event recorder, or the like, present on the vehicle 20.

In order to prevent the issuance of false alarms, in various aspects, the methods and systems of the present technology can include the use of one or more authentication system that incorporates a listing of authorized personal electronic devices. For example, the system can be provided with a list of authorized devices owned and operated by an authorized user of family member of a user. Thus, when the system only detects the presence of an authorized device, it does not send notifications.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method for obtaining identification information from a potential trespasser responsive to a detection of a potential theft, vandalism, or intrusion into a vehicle, the method comprising:
   receiving a signal from at least one sensor in communication with a vehicle controller and configured to sense a change in an external environment or a status of the vehicle;
   determining that the signal represents or contains information indicative of a theft, vandalism, or unauthorized intrusion into the vehicle;
   obtaining, using a receiver device, identification information from a personal electronic device of the potential trespasser that is in proximity of the vehicle; and
   sending a notification to a user indicating that the vehicle may have been subjected to theft, vandalism, or unauthorized intrusion.

2. The method according to claim 1, further comprising obtaining still images, video data, and/or audio data of the external environment after determining that the signal represents or contains information indicative of the vandalism or the intrusion into the vehicle.

3. The method according to claim 2, further comprising reviewing the still images, video data, and/or audio data of the external environment to detect a presence of a trespasser prior to obtaining the identification information.

4. The method according to claim 2, wherein the notification comprises at least one of: the identification information obtained from the personal electronic device of the potential trespasser; a still image; a video recording; and an audio recording.

5. The method according to claim 1, further comprising:
   sending a notification to a law enforcement agency indicating that the vehicle may have been subjected to theft, vandalism, or unauthorized intrusion into the vehicle.

6. The method according to claim 1, wherein obtaining identification information from the personal electronic device of the potential trespasser in proximity of the vehicle using a receiver device comprises:
   passively receiving and extracting identification information from a probe request emitted by the personal electronic device of the potential trespasser.

7. The method according to claim 1, wherein obtaining identification information from the personal electronic device of the potential trespasser that is in proximity of the vehicle using a receiver device comprises:
   actively sending a broadcast packet on at least one communication channel and receiving and extracting information from a reply sent by the personal electronic device of the potential trespasser.

8. The method according to claim 1, wherein the receiver device comprises at least one of a Wi-Fi scanner, a Bluetooth scanner, and a digital signal processing (DSP) receiver configured to obtain the identification information from the personal electronic device of the potential trespasser in proximity of the vehicle.

9. The method according to claim 1, wherein obtaining the identification information comprises obtaining at least one identifier from the group consisting of: a vendor name; a device name; a username; a media access control (MAC) address; a received signal strength indicator (RSSI); an access point (AP); a class of device (CoD); a timestamp; a serial number; and a model number associated with the personal electronic device of the potential trespasser.

10. The method according to claim 1, wherein the sensor comprises at least one of a vehicle alarm; a window sensor; a shock detector; an impact monitor; an accelerometer; a motion detector; an infrared sensor; a weight sensor; a vibration sensor; a force sensor; a motion camera sensor; and a still camera sensor.

11. The method according to claim 1, wherein the personal electronic device of the potential trespasser is selected from the group consisting of: a tablet; an e-reader; a smartphone; a smartwatch; a smart wearable device; a computer; an RFID-equipped device; and an NFC-equipped device.

12. The method according to claim 1, further comprising transferring data representative of at least one signal received from the sensor or identification information received from the receiver device to a remote location.

13. A vehicle monitoring system for obtaining identification information from a personal electronic device of a potential trespasser responsive to a potential theft, vandalism, or intrusion into a vehicle, the vehicle monitoring system comprising:
   a sensor system including at least one sensor configured to sense a change in an external environment or a status of the vehicle;
   a receiver device configured to receive wireless communications; and
   a processor operatively connected to the sensor system and the receiver device, the processor being programmed to initiate executable operations comprising:
      receiving a signal or information from the at least one sensor of the sensor system;
      determining that the signal or information represents or contains information indicative of a theft, vandalism, or unauthorized intrusion into the vehicle; and
      obtaining, using the receiving device, identification information from the personal electronic device of the potential trespasser that is in proximity of the vehicle.

14. The vehicle monitoring system according to claim 13, further comprising a camera system including an array of cameras configured to capture the external environment of the vehicle, wherein the executable operations further comprise obtaining still images, video data, and/or audio data of the external environment after determining that the signal represents or contains information indicative of the theft, vandalism, or unauthorized intrusion into the vehicle.

15. The vehicle monitoring system according to claim 13, wherein the executable operations further comprise:

sending a notification to a user and/or law enforcement indicating that the vehicle may have been subjected to theft, vandalism, or unauthorized intrusion into the vehicle.

16. The vehicle monitoring system according to claim 15, wherein the notification comprises at least one of: the identification information obtained from the personal electronic device of the potential trespasser; a still image; a video recording; and an audio recording.

17. The vehicle monitoring system according to claim 13, wherein obtaining identification information from the personal electronic device of the potential trespasser that is in proximity of the vehicle using the receiver device comprises:
  passively receiving and extracting identification information from a probe request emitted by the personal electronic device of the potential trespasser.

18. The vehicle monitoring system according to claim 13, wherein obtaining identification information from the personal electronic device in proximity of the vehicle using the receiver device comprises:
  actively sending a broadcast packet on at least one communication channel and receiving and extracting information from a reply sent by the personal electronic device of the potential trespasser.

19. A vehicle, comprising:
  a sensor system including at least one sensor configured to sense a change in an external environment or a status of the vehicle;
  a receiver device configured to receive wireless communications;
  a camera system configured to capture still images, video data, and/or audio data of the external environment;
  a communications device; and
  a vehicle control system including a processor operatively connected to the sensor system, the receiver device, the camera system, and the communications device; the processor being programmed to initiate executable operations comprising:
    receiving a signal or information from the at least one sensor of the sensor system;
    determining that the signal or information represents or contains information indicative of a theft, vandalism, or unauthorized intrusion into the vehicle;
    obtaining still images, video data, and/or audio data of the external environment; and
    obtaining, using the receiving device, identification information from a personal electronic device of a potential trespasser that is in proximity of the vehicle.

20. The vehicle according to claim 19, wherein obtaining identification information from the personal electronic device in proximity of the vehicle using the receiver device comprises at least one of:
  passively receiving and extracting identification information from a probe request emitted by the personal electronic device of the potential trespasser; and
  actively sending a broadcast packet on at least one communication channel and receiving and extracting information from a reply sent by the personal electronic device of the potential trespasser.

* * * * *